United States Patent
Liu et al.

[11] Patent Number: 6,135,555
[45] Date of Patent: Oct. 24, 2000

[54] TUMBLING VEHICLE SEAT ASSEMBLY

[75] Inventors: Frank Qiukui Liu, Canton; Majid Jack Hammoud, Dearborn; Jingduan Guo, Farmington Hills, all of Mich.

[73] Assignee: Ford Motor Company, Dearborn, Mich.

[21] Appl. No.: 09/444,743

[22] Filed: Nov. 22, 1999

[51] Int. Cl.$^7$ ........................................................ B60N 2/02
[52] U.S. Cl. ........................................ 297/336; 297/378.12
[58] Field of Search ............................... 297/336, 335, 297/331, 340, 326, 354.12, 378.1, 378.12; 296/65.01, 65.05, 65.09

[56] References Cited

U.S. PATENT DOCUMENTS

| | | |
|---|---|---|
| 3,114,574 | 12/1963 | Pryale . |
| 4,627,656 | 12/1986 | Gokimoto et al. . |
| 4,636,003 | 1/1987 | Siebler . |
| 4,736,985 | 4/1988 | Fourrey et al. . |
| 5,195,795 | 3/1993 | Cannera et al. . |
| 5,238,285 | 8/1993 | Holdampf et al. . |
| 5,393,116 | 2/1995 | Bolsworth et al. . |
| 5,482,349 | 1/1996 | Richter et al. . |
| 5,498,051 | 3/1996 | Sponsler et al. . |
| 5,570,931 | 11/1996 | Kargilis et al. . |
| 5,588,707 | 12/1996 | Bolsworth et al. . |
| 5,593,208 | 1/1997 | Mitschelen et al. . |
| 5,626,391 | 5/1997 | Miller et al. . |
| 5,634,686 | 6/1997 | Okazaki . |
| 5,765,894 | 6/1998 | Okazaki et al. . |
| 5,934,732 | 8/1999 | Jakubiec . |
| 6,000,742 | 12/1999 | Schaefer et al. . |
| 6,012,771 | 1/2000 | Shea . |

FOREIGN PATENT DOCUMENTS 2 251 183  7/1992  United Kingdom .

*Primary Examiner*—Milton Nelson, Jr.
*Attorney, Agent, or Firm*—Gregory P. Brown; Roger L. May

[57] ABSTRACT

A collapsible vehicle seat assembly includes a lower seat with a seat back pivotally connected with respect to the lower seat and having a flat back. Front and rear legs are pivotally connected to the lower seat. The lower seat, seat back and legs are selectively movable between a first position for seating wherein the legs and seat back are substantially upright, a second position for storage wherein the legs and flat back are generally horizontal such that the flat back forms a load floor, and a third position for ingress/egress wherein the lower seat and seat back are substantially upright.

10 Claims, 4 Drawing Sheets

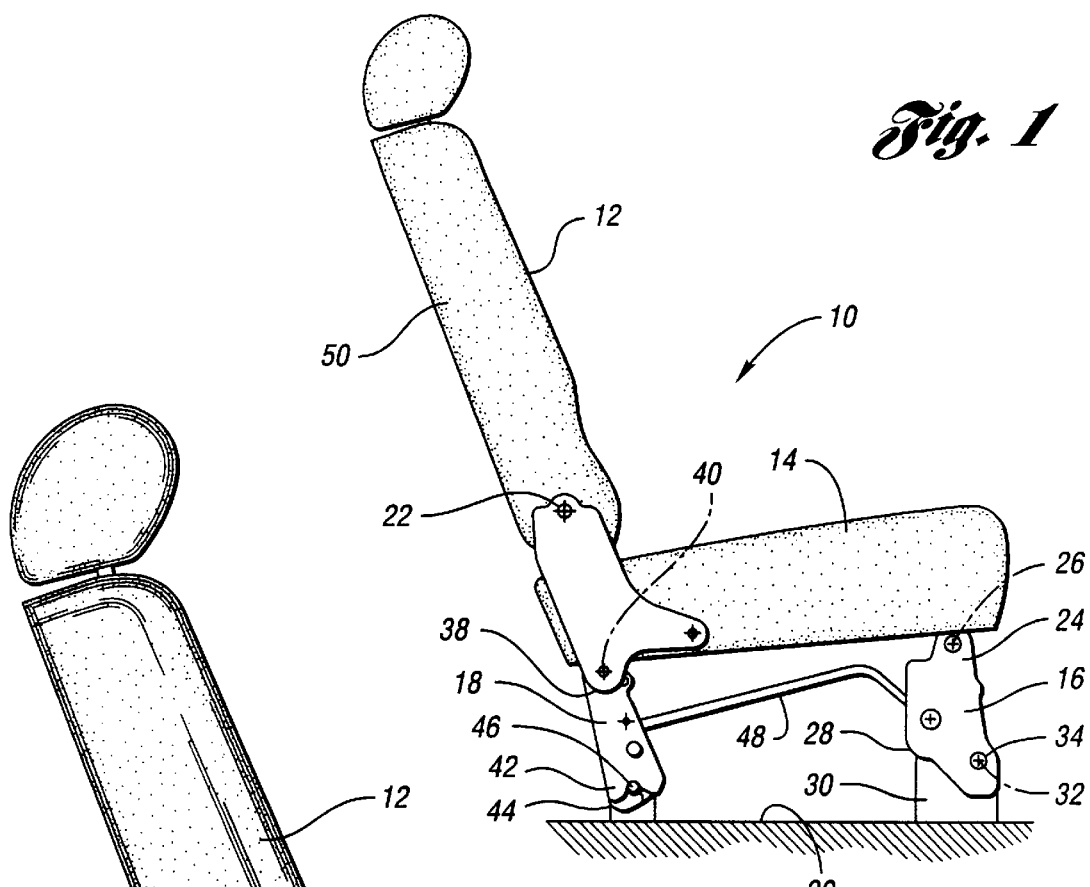
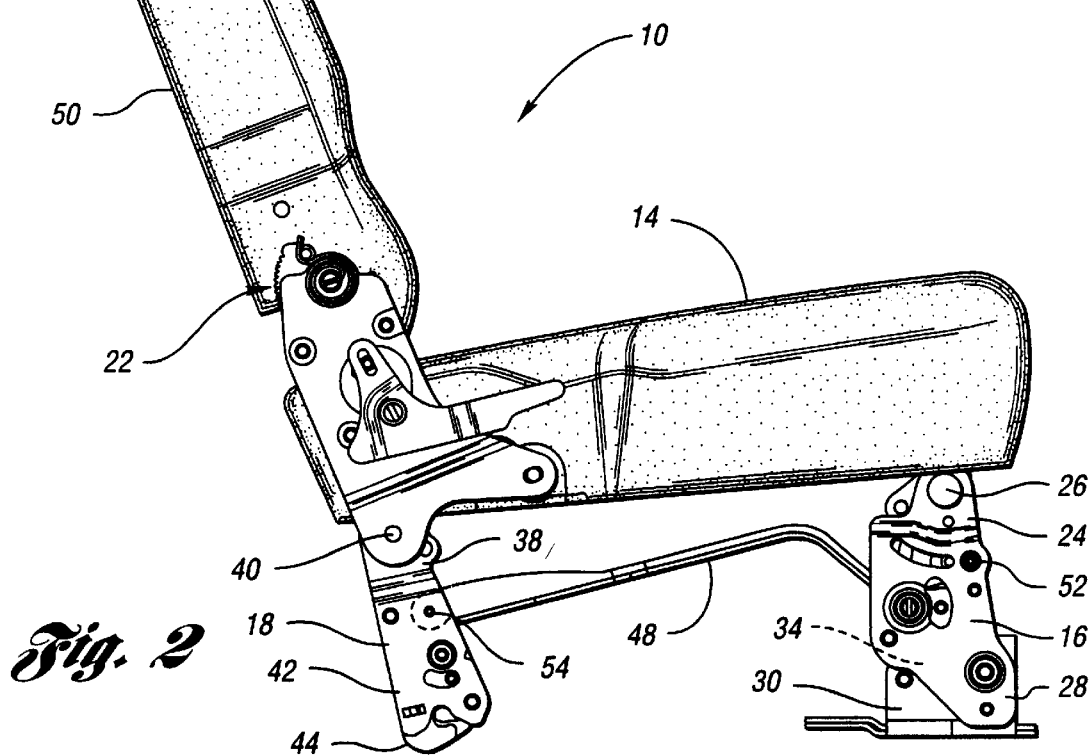

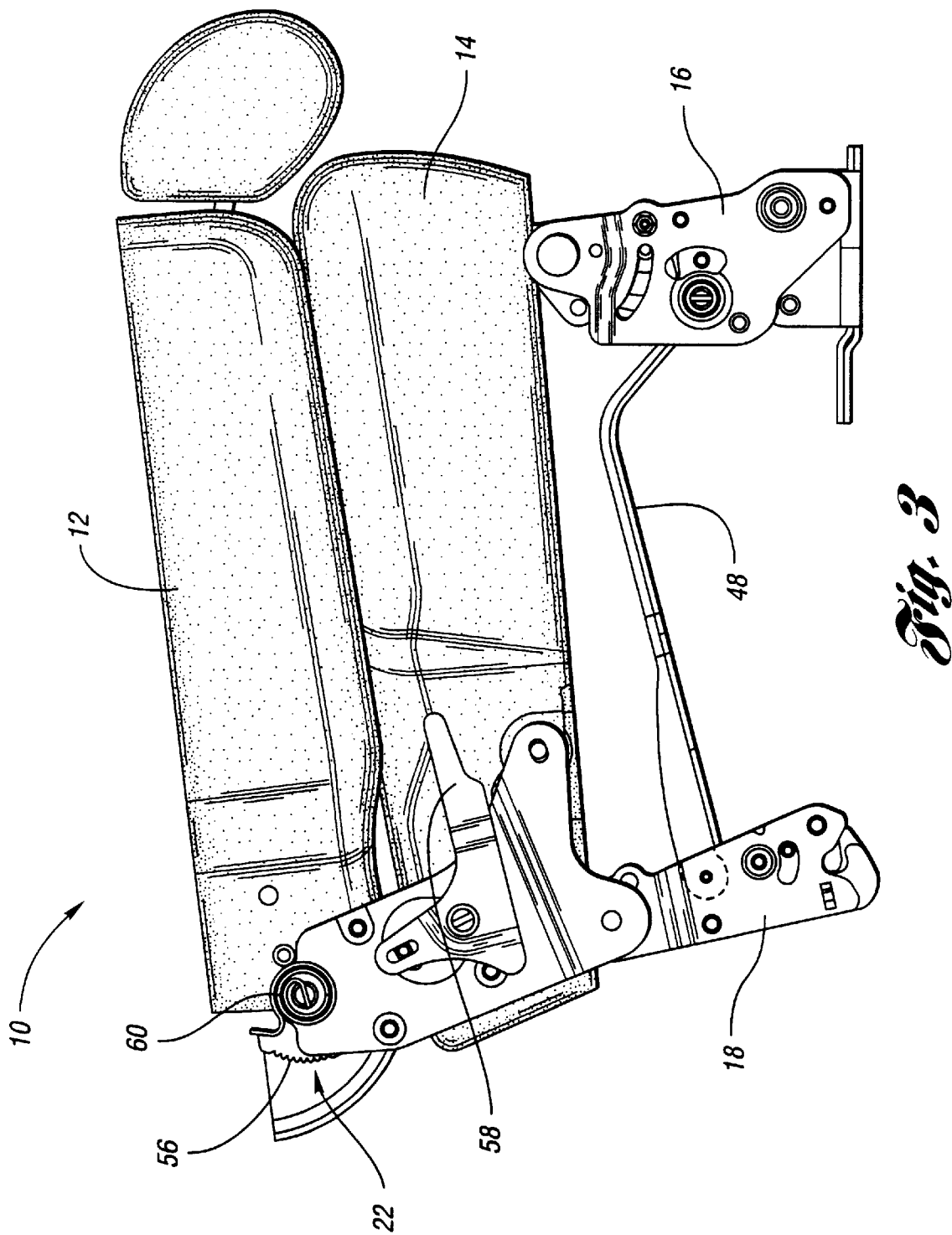

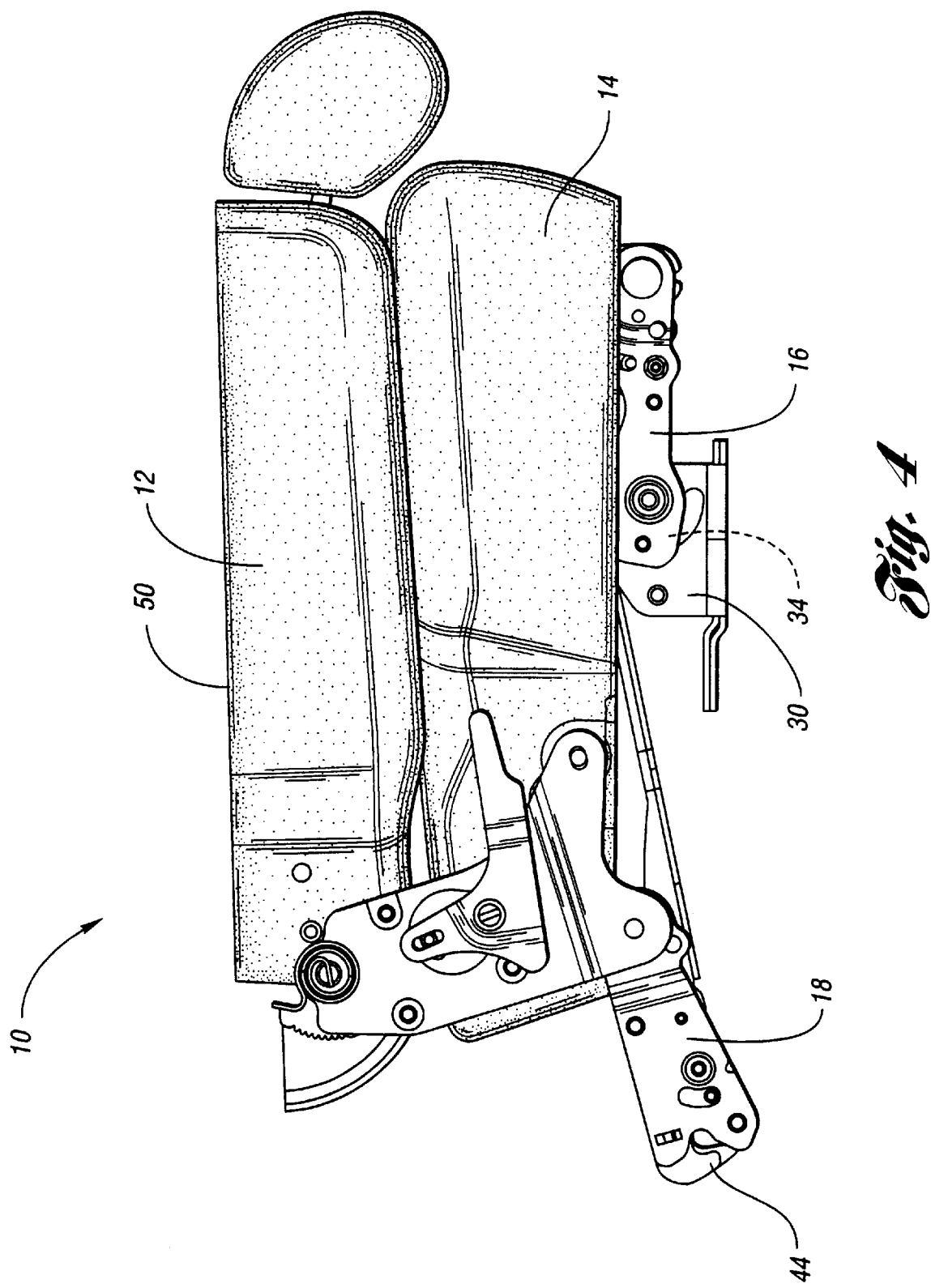

TUMBLING VEHICLE SEAT ASSEMBLY

TECHNICAL FIELD

The present invention relates to a tumbling vehicle seat assembly which is movable between a seating position, an upright position for easy entry, and a stowage position for forming a cargo load floor.

BACKGROUND OF THE INVENTION

In various types of automotive seating arrangements, it is frequently desirable, or even necessary, to provide the capability of flattening, folding, and collapsing a seat assembly in order to increase the vehicle's cargo space, accommodate large or bulky items that need to be transported, to use the seat as a load floor, or to otherwise enhance the vehicle's utility or meet the desires or needs of the user. Such capability is especially important in vans, minivans, recreational vehicles, or multipurpose vehicles, as well as in other similar types of vehicles.

For trucks and vans, there is a need to have rear seats that can be stowed or folded into a load floor. For the second row of seats, there is also a need for easy entry, meaning the seat has to be folded to allow third row occupants to get into and out of the vehicle.

Prior art mechanisms have been devised to allow the seat to tumble forward for easy entry. Also, mechanisms have been devised to allow the seat to fold forward into a load floor. However, an improved seat design including both such features is desirable.

DISCLOSURE OF THE INVENTION

The present invention provides a vehicle seat assembly which provides the functions of: seat back reclining and collapsing; seat tumbling to an upright position for ingress/egress; and seat collapse to a stowage position to form a cargo load floor. In general, this is accomplished by a collapsible fourbar link design in combination with a rear floor latch, a front floor lock, and a collapsible seat recliner.

More specifically, the present invention provides a collapsible vehicle seat assembly including a lower seat and a seat back pivotally connected to the lower seat and having a flat back. A pair of front legs and a pair of rear legs are pivotally connected to the lower seat. The lower seat, seat back and legs are selectively movable between a first position for seating wherein the legs and seat back are substantially upright, a second position for storage wherein the legs and seat back are generally horizontal such that the flat back forms a load floor, and a third position for ingress/egress wherein the lower seat and seat back are substantially upright.

A link pivotally connects the front and rear legs to cause movement of the rear legs to a generally vertical position when the seat assembly is moved to the third position to enhance ingress/egress. At least one of the rear legs includes a latch for selective attachment to a vehicle floor, and the seat back includes a collapsible recliner mechanism for selectively reclining the seat back with respect to the lower seat. The front legs include locks for selectively locking the front legs to vehicle floor brackets to prevent pivotal movement of the front legs with respect to the floor brackets.

Accordingly, an object of the present invention is to provide a vehicle seat assembly which is collapsible into a load floor position, and movable to a tumbled, upright position for easy entry.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic side view of a vehicle seat assembly in accordance with the present invention;

FIG. 2 shows a side view of a seat assembly in accordance with the present invention in the upright position;

FIG. 3 shows the seat assembly of FIG. 2 with the seat back folded down;

FIG. 4 shows the seat back of FIG. 3 with the front and rear legs collapsed such that the assembly is in a load floor position.

DETAILED DESCRIPTION OF THE PREFERRED EMBODIMENT

Figure 5:
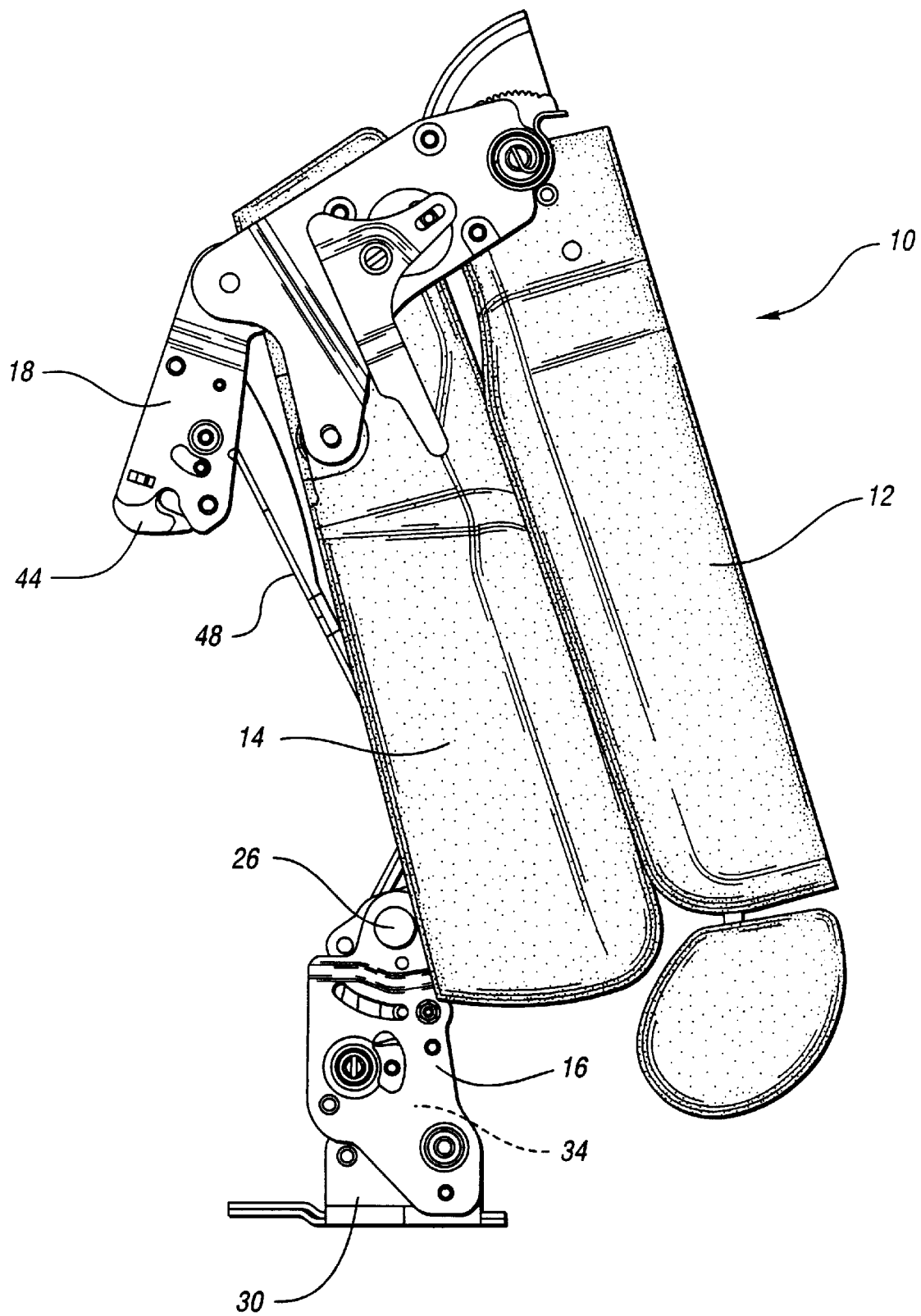
FIG. 5 shows the seat assembly of FIG. 2 in the upright, easy entry position.

The present invention is readily understood with reference to the schematic diagram of FIG. 1. FIG. 1 shows a schematic of a seat assembly 10 including a seat back 12 pivotally connected with respect to a lower seat 14, and including front and rear legs 16,18, respectively, for attachment to a vehicle floor 20. A collapsible recliner mechanism 22 is positioned at the pivotal connection between the seat back 12 and the lower seat 14 to allow adjustment of the reclined position of the seat back 12, as well as collapse of the seat back 12 against the lower seat 14.

The front leg 16 includes a first end 24 which is pivotally connected at a joint 26 to the lower seat 14, and a second end 28 which is pivotally connected to a floor bracket 30 at a pivot joint 32. A pivot lock 34 is positioned at the pivot joint 32 for selectively locking pivotal motion of the front leg 16 with respect to the floor bracket 30.

The front leg 16 is free to rotate about the joint 26 with respect to the lower seat 14 when the pivot lock 34 is unlocked.

The rear leg 18 is pivotally connected at a first end 38 to the lower seat 14 about a pivot joint 40. Pivot joint 40 is unrestricted to allow free pivotal movement of the rear leg 18 with respect to the lower seat 14.

The second end 42 of the rear leg 18 includes a latch 44 for selectively attaching and detaching the second end 42 from a striker 46. A link 48 is pivotally connected at opposing ends to the front and rear legs 16,18.

FIG. 1 illustrates the assembly 10 in the upright position for seating. In order to tumble the assembly to an easy entry position, the collapsible recliner 22 is released, and the seat back 12 is folded against the lower seat 14. The latch 44 is then unlatched to detach the rear leg 18 from the striker 46. At this point, the seat back 12, lower seat 14, and rear leg 18 may be pivoted upward to a position above the front leg 16 (corresponding with the position shown in FIG. 5) so that these components are moved away to allow third row occupants to enter or exit (ingress/egress) the vehicle.

As the seat back 12, lower seat 14, and rear leg 18 are pivoted upward, the link 48 pulls the rear leg 18 inward such that it maintains a substantially vertical orientation to enhance ingress/egress. During this operation, the pivot lock 34 remains locked to prevent pivotal movement of the front leg 16 with respect to the floor bracket 30. A spring may be provided about the pivot joint 26 to maintain the assembly 10 in the easy entry position.

In order to alter the seat assembly 10 from the seating position shown in FIG. 1 to a load floor position (corresponding with the position shown in FIG. 4), the collapsible recliner 22 is released to allow the seat back 12 to pivot flat against the lower seat 14. The pivot lock 34 is then unlocked to allow pivotal movement of the front leg 16 with respect to the floor bracket 30. The assembly 10 may then be simply collapsed downward to a position in which the front and rear legs 16,18 are collapsed to a generally horizontal position against the vehicle floor 20, and the flat back 50 of the seat back 12 is in a horizontal position to form a vehicle load floor.

Of course, appropriate handles may be provided for operating the recliner 22, latch 44, and pivot lock 34. Such handles, and the working mechanics of the collapsible recliner 22, latch 44, and pivot lock 34 could operate in a variety of manners, and the mechanics of such individual components are well known in the art and do not form a part of this invention, and therefore will not be described in detail herein.

Turning to FIGS. 2–5, a vehicle seat assembly 10 is shown corresponding with the schematic of FIG. 1, wherein like numerals are used to identify like components. FIG. 2 shows the seat assembly 10 in the upright position corresponding with that shown in FIG. 1. The seat assembly 10 of FIG. 2 includes all the same features described with reference to FIG. 1. For packaging reasons, the link 48 is bent, and attached to the legs 16,18 at pivot joints 52,54, respectively. As shown, the legs 16,18 and seat back 12 are substantially upright to form the seating position.

Turning to FIG. 3, the first step in collapsing the seat assembly 10 to a load floor or easy entry position is to collapse the seat back 12 against the lower seat 14. This is accomplished by releasing the collapsible recliner mechanism 22. As shown, the collapsible recliner includes a toothed bracket which is engaged and disengaged for seat back 12 angle adjustment by releasing the lever 58. When the lever 58 is pulled to disengage the toothed bracket 56, the coil spring 60 automatically collapses the seat back 12 to the folded position shown in FIG. 3. The details of such a recliner mechanism 22 are well known in the art and therefore not described here in detail. However, the collapsible recliner 22 is preferably a "pawl and sector" recliner including a toothed arm engageable with a toothed pawl. This product is commonly available on the market from various companies, such as Faurecia of Troy, Mich., Fisher Dynamics of St. Clair Shores, Mich., Magna International of Livonia, Mich., or Lear Corporation of Southfield, Mich.

In order to further collapse the seat assembly 10 from the position shown in FIG. 3 to the load floor position shown in FIG. 4, the pivot lock 34 is released to allow pivotal movement of the front leg 16 with respect to the floor bracket 30. Because all other pivot joints 26, 40, 46, 52, 54 are free to rotate, the entire assembly is allowed to collapse to the load floor position wherein the front and rear legs 16,18 are positioned generally horizontally against the vehicle floor, and the flat back 50 of the seat back 12 is exposed to provide a vehicle load floor. The pivot lock 34 is not described in detail herein because such structure is well known in the art. The pivot lock 34 may comprise a cooperating pin and slot or any lockable cam mechanism which is operative to selectively pivotally lock the front leg 16 with respect to the floor bracket 30. A release lever may be provided along the side of the front leg 16 or near the rear end of the lower seat 14, or elsewhere if convenient. In the load floor position in FIG. 4, the latch 44 remains latched.

In order to alter the seat assembly 10 from the position shown in FIG. 3 to the easy entry position shown in FIG. 5, the latch 44 is released to unlatch the rear leg 18 from the striker 46 (shown in FIG. 1). The pivot lock 34 of the front leg 16 remains locked, and the lower seat 14 and seat back 12 may be pivoted about the pivot joint 26 to stand the assembly in the generally vertical position shown in FIG. 5. As the seat back 12 and lower seat 14 are pivoted upward about the pivot joint 26, the link 48 pulls the rear leg 18 inward so that it maintains its generally vertical orientation to enhance ingress/egress. Accordingly, the seat back 12, lower seat 14, and front and rear legs 16,18 are substantially upright, and a rotary spring may be provided at the joint 26 to maintain the seat assembly 10 in the easy entry position shown in FIG. 5.

In order to release the latch 44, a handle will be provided along the rear leg 18, or adjacent the rear portion of the lower seat 14, or elsewhere if convenient. The latch 44 is preferably a hook latch for engaging the striker 46, and is commonly available from those companies listed above.

In an alternative embodiment, the pivot joint 26 may include a pivot lock, rather than the pivot joint 32. However, in this embodiment, when the seat assembly is pivoted to its upright easy entry position, the entire assembly 10 would pivot forward in the vehicle about the pivot joint 32, which may present packaging problems.

Only a single front and rear leg 16,18 are shown in the Figures, but of course a pair of such front and rear legs 16,18 would be provided. Also, the latch 44 need not be provided on both of the rear legs. In fact, it is desirable to have only a single latch 44 for weight reduction and manufacturing cost reduction.

While the best mode for carrying out the invention has been described in detail, those familiar with the art to which this invention relates will recognize various alternative designs and embodiments for practicing the invention within the scope of the appended claims.

What is claimed is:

1. A collapsible vehicle seat assembly comprising:
   a lower seat;
   a seat back pivotally connected with respect to the lower seat and having a flat back; and
   front and rear legs pivotally connected to the lower seat;
   wherein said lower seat, seat back and legs are selectively movable between a first position for seating wherein the legs and seat back are substantially upright, a second position for storage wherein the legs and flat back are generally horizontal such that the flat back forms a load floor, and a third position for ingress/egress wherein the lower seat and seat back are substantially upright.

2. The collapsible vehicle seat assembly of claim 1, further comprising at least one link pivotally connected to said front and rear legs to cause movement of said rear legs to a generally vertical position when the seat assembly is in said third position to enhance ingress/egress.

3. The collapsible vehicle seat assembly of claim 2, wherein said rear leg includes a latch for selective attachment to a vehicle floor.

4. The collapsible vehicle seat assembly of claim 1, wherein said seat back includes a collapsible recliner mechanism for selectively reclining the seat back with respect to the lower seat.

5. The collapsible vehicle seat assembly of claim 3, wherein said front leg is freely pivotally connected to said lower seat at a first end and includes a lock at a second end to selectively lock the front leg to a floor bracket to prevent pivotal movement of the front leg with respect to the floor bracket.

6. The collapsible vehicle seat assembly of claim 5, wherein said rear leg includes first and second ends and said link is pivotally connected at opposing ends to one of the front and rear legs between the respective first and second ends.

7. A collapsible vehicle seat assembly comprising:

a lower seat;

a seat back pivotally connected with respect to the lower seat and having a flat back;

a front leg and a rear leg each having first and second ends and each pivotally connected at the first end to the lower seat;

a collapsible recliner device positioned at the pivotal connection between the lower seat and the seat back for selectively collapsing the seat back against the lower seat;

a detachable latch connected to the second end of said rear leg for selectively attaching and detaching the second end to a vehicle floor; and a locking mechanism connected to the second end of said front leg for selectively locking and unlocking pivotal movement of the front leg with respect to a vehicle floor bracket;

whereby said lower seat, seat back, and legs are selectively movable between a first position for seating wherein the legs and seat back are substantially upright, a second position for storage wherein the legs and flat back are generally horizontal such that the flat back forms a load floor, and a third position for ingress/egress wherein the lower seat and seat back are substantially upright and supported by the front leg.

8. The collapsible vehicle seat assembly of claim 7, further comprising at least one link pivotally connected to said front and rear legs to cause movement of said rear legs to a generally vertical position when the seat assembly is in said third position to enhance ingress/egress.

9. The collapsible vehicle seat assembly of claim 8, wherein the first ends of the front and rear legs are freely pivotally mounted to the lower seat for unrestricted pivotal movement.

10. A collapsible vehicle seat assembly comprising:

a lower seat;

a seat back pivotally connected with respect to the lower seat and having a flat back;

a pair of front legs and a pair of rear legs pivotally connected to the lower seat;

wherein said lower seat, seat back, and legs are selectively movable between a first position for seating wherein the legs and seat back are substantially upright, a second position for storage wherein the legs and flat back are generally horizontal such that the flat back forms a load floor, and a third position for ingress/egress wherein the lower seat and seat back are substantially upright; and at least one link pivotally connected to said front and rear legs to cause movement of said rear legs to a generally vertical position when the seat assembly is in said third position to enhance ingress/egress.

* * * * *